United States Patent [19]

Watanabe

[11] Patent Number: 5,420,629
[45] Date of Patent: May 30, 1995

[54] SOLID STATE IMAGE SENSING DEVICE
[75] Inventor: Takashi Watanabe, Kyoto, Japan
[73] Assignee: Sharp Kabushiki Kaisha, Osaka, Japan
[21] Appl. No.: 180,769
[22] Filed: Jan. 10, 1994

Related U.S. Application Data

[63] Continuation of Ser. No. 760,003, Sep. 13, 1991, abandoned.

[30] Foreign Application Priority Data

Sep. 13, 1990 [JP] Japan ............................ 2-244973

[51] Int. Cl.⁶ .............................................. H04N 5/30
[52] U.S. Cl. ................................... 348/207; 348/230; 348/297
[58] Field of Search ............... 348/297, 298, 312, 320, 348/294, 321, 322, 323, 230, 229, 207; H04N 5/335, 5/30

[56] References Cited

U.S. PATENT DOCUMENTS

| | | | |
|---|---|---|---|
| 4,415,937 | 11/1983 | Nishizawa et al. | 358/335 |
| 4,503,466 | 3/1985 | Ryan | 358/211 |
| 4,614,966 | 9/1986 | Yunoki et al. | 348/282 |
| 4,819,075 | 4/1989 | Imaide et al. | 348/440 |
| 4,839,734 | 6/1989 | Takemura | 358/213.26 |
| 4,849,813 | 7/1989 | Hirao et al. | 348/440 |
| 4,974,093 | 11/1990 | Murayama et al. | 358/213.19 |
| 4,996,600 | 2/1991 | Nishida et al. | 358/213.22 |
| 5,057,926 | 10/1991 | Watanabe | 358/213.19 |

FOREIGN PATENT DOCUMENTS 0290264 11/1988 European Pat. Off. ....... H04N 3/15

OTHER PUBLICATIONS

European Search Report.

Primary Examiner—Joseph Mancuso
Assistant Examiner—Tuan V. Ho

[57] ABSTRACT

An improved solid state image sensing device includes a two-dimensional array type charge-coupled device. The read rate thereof is increases n times a standard read rate, where n is a positive integer larger than one, and the output signals of the charge-coupled device are added n times with respect to the same pixel or to the same combination of pixels. The sum of the addition stored in a memory is read at the standard read rate, so that the dynamic range of the solid state image sensing device is expanded.

26 Claims, 5 Drawing Sheets

SOLID STATE IMAGE SENSING DEVICE

This application is a continuation of application Ser. No. 07/760,003, filed on Sep. 13, 1991, now abandoned.

BACKGROUND OF THE INVENTION

1. Field of the Invention

The present invention relates to a charge-transfer type image sensing device, and in particular to the enhancement of the performance thereof.

2. Description of Background Art

Many types of two-dimensional solid state image sensor are known, and charge transfer type devices such as CCDs which operate with lower noise are also known.

Recently, the size of CCD image sensor continues to decrease with the number of pixels of a CCD image sensor increasing rapidly. Thus, area per pixel, that is cell size, is being reduced to a large extent.

The reduction of cell size brings about problems with respect to sensor characteristics. The sensitivity and the amount of charges to be dealt with become lower rapidly because an ineffective area which does not contribute to the sensitivity exists and a two-dimensional effect arises, when compared with a case wherein the sensitivity and the amount of charges decrease in proportion to the cell size.

Recently, a technique of forming a microlens arranged above a photosensitive part of a CCD sensor so as to expand the effective photoelectric transformation area has been used. Even if the cell size is reduced, the sensitivity can almost be kept the same by using the microlens, but the amount of charges to be dealt with decreases largely so as to lower the dynamic range of an image.

SUMMARY OF THE INVENTION

It is an object of the present invention to provide a solid state image sensing device having a large dynamic range for a small cell size.

A solid state image sensing device according to the present invention comprises: (a) an image sensor for sensing an optical image, the image sensor including a two-dimensional array type charge-coupled device; (b) a adder for adding output signals of the charge-coupled device with respect to the same pixel or to the same combination of pixels n times, where n is a positive integer larger than one; (c) a memory for storing the sums of the addition by the adder; (d) a clock control for feeding first clock signals of n times a predetermined read rate of the charge-coupled device to the image sensor for the image sensing and the adder for the summation and second clock signals of the predetermined read rate to the memory for the read of the sums.

It is an advantage of the present invention that the dynamic range of the total image sensing device can be expanded easily without by changing the structure of image sensing element itself.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

Further objects and advantages of the present invention will be apparent from the following description, reference being made to the accompanying drawings, wherein preferred embodiments of the present invention are clearly shown which are given by way of illustration only, and thus are not limitative of the present invention.

DETAILED DESCRIPTION OF THE PREFERRED EMBODIMENTS

Referring now to the drawings, wherein like reference characters designate like or corresponding parts throughout the several views, preferred embodiments of the present invention will be explained in detail.

A two-dimensional array type charge-coupled device is classified into the interline transfer type and the frame transfer type. In an interline transfer type device (refer to FIG. 1) to be used in the embodiments, a plurality of pixels are arrayed as a matrix, and a storage portion shaded optically is provided between lines of photosensitive portion made of pixels. In each optical integration period, signals of a part or all of the pixels of a line are transferred together to storage portions, and then the signals are successively read from the storage portions in the remaining period which takes a large part of the optical integration time. Two storage modes, frame storage mode and field storage mode, are possible when an interline transfer type charge-coupled device is operated in a 2:1 interlace mode.

On the other hand, in a frame transfer type device, a plurality of pixel are also arrayed as a matrix, and a storage portion made of pixels and a storage portion shaded optically are arranged in series in the transfer direction. In each optical integration period, signals of photosensitive portions are transferred to storage portions rapidly, and the signals are successively read from the storage portions in the remaining period which takes a large part of the optical integration period. Only the field storage mode is possible for a frame transfer type device.

The interline transfer type is presently used generally because smaller false signals called "smear" appear above and below an object of high light quantity and a smaller chip size is required. Though the present invention can also be applied to a frame transfer type of charge-coupled device, an interline type charge-coupled device is used in the embodiments for the image sensing element, and it is used in the field accumulation mode wherein an optical integration period of each pixel consists of a field.

Figure 1:
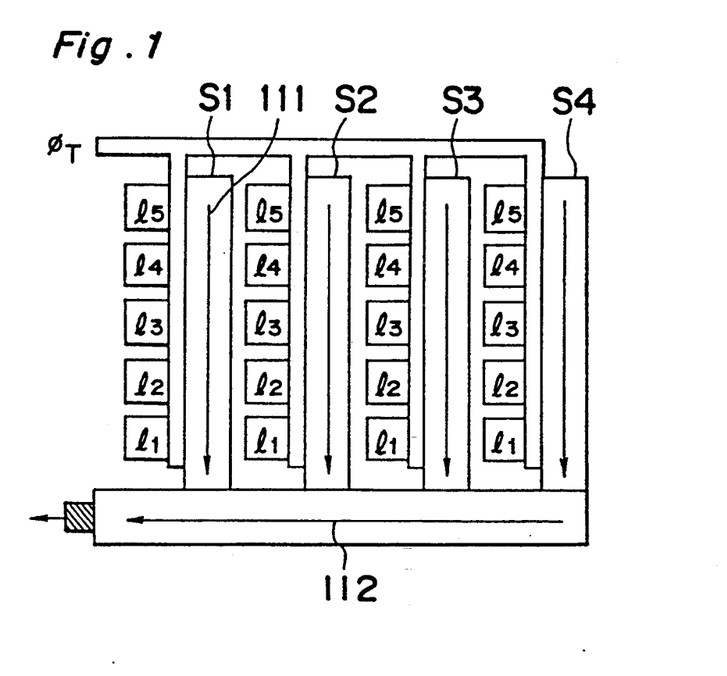
FIG. 1 is a schematic diagram of the charge-coupled device of two-dimensional array type.

FIG. 1 shows schematically a charge-coupled device of the interline transfer type, wherein four Vertical lines of photosensitive portions each made of five pixels 11, 12, ..., 15 are aligned in parallel to each other in the horizontal direction and storage portions S1, S2, S3 and S4 are arranged between the lines. Arrows 111 designate the direction of read-out, while an arrow 112 designates the direction of horizontal scan. In order to transfer signals from the photosensitive portions to the storage portions arranged between two lines of photosensitive portions, signals of all pixels are transferred in a first field to the storage portions and the signals of two pixels in the vertical direction are added, while signals of all pixels are also transferred in a second field to the storage portions and the signals of two pixels in the vertical direction of a combination different from that in the first field are added. In other words, in a first field, two signals of adjacent pixels are summed to give $S_{l1}+S_{l2}$, $S_{l3}+S_{l4}$, and so on, wherein $S_p$ designates a signal of a pixel p, while in a second field, two signals of adjacent pixels of a different combination from that of the first period are summed to give $S_{l2}+S_{l3}$, $S_{l4}+S_{l5}$, and so on. Then, the signals are read successively from the storage portions in each field.

Figure 2:
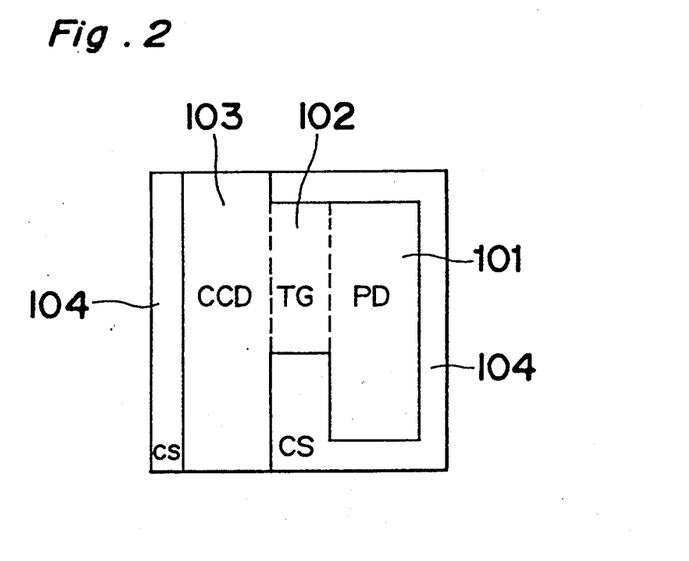
FIG. 2 is a plan view of a single pixel portion of a charge-coupled device of interline transfer type.

FIG. 2 shows a single pixel portion of the charge-coupled device array 1, which is composed of a photodetecting portion 101 to perform photoelectric transformation, a portion 102 to transfer signal charges stored in the photodetecting portion 101 in a short time to a CCD portion 103, the CCD portion 103 to transfer the charges to a detector portion, and a channel stop portion 104 to isolate the pixel from adjacent pixels.

When the size of a pixel is decreased, the area of the photodetecting portion 101 decreases, to thereby lower the sensitivity due to the decrease in photoelectric transformation area. Further, the decrease in the areas of the photodetecting portion (PD) 101 and the CCD portion 103 lowers the maximum charges $Q_{max}(PD)$ and $Q_{max}(CCD)$ to be retained, respectively. If the signal charges exceed these values, they run over the pixel so as to deteriorate the quality of image. In general, a pixel is designed so that $Q_{max}(PD)$ is larger than $Q_{max}(CCD)$ because this condition is better for an image. In this case, $Q_{max}(CCD)$ is a basis of the amount of charges to be dealt with.

Figure 3:
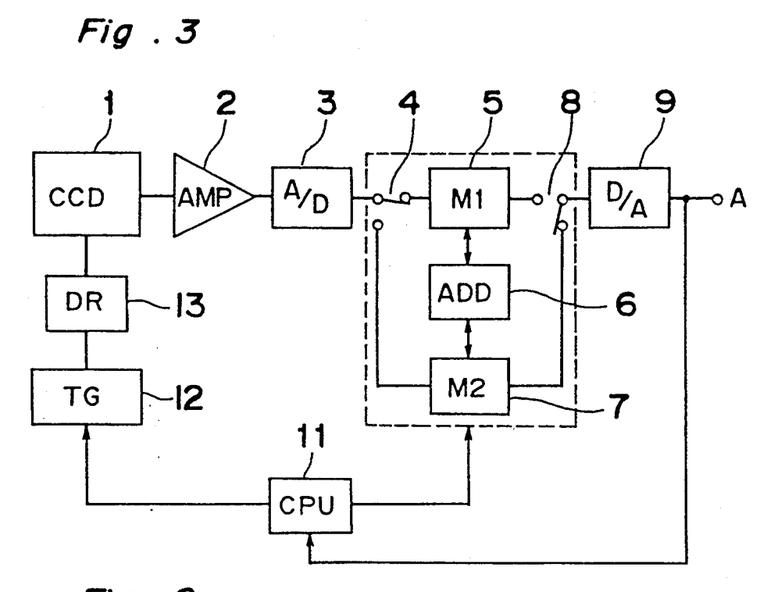
FIG. 3 is a block diagram of an embodiment of the drive unit for a solid state image sensing device.

FIG. 3 shows a block diagram of an embodiment of a solid state image sensing device according to the present invention. A charge-coupled device array 1 is an interline transfer type two-dimensional charge-coupled device, and it is operated in the field storage mode.

A central processing unit 11 controls the driving of the charge-coupled device array 1. That is, the central processing unit 11 sends a signal to a timing generator 12 which generates clock signals. The clock signals are fed to a driver 13 which drives the charge coupled device array 1. As will be explained later in detail, the driving rate or read rate of the charge-coupled device array 1 is n times the standard read rate when the quantity of light is high, wherein n is an integer larger than one, while the driving rate is the standard read rate when the quantity of light is low. In this embodiment, n is four. It is preferable generally that the standard read rate agrees with the television broadcasting standard.

An output signal of the charge-coupled device array 1 is amplified by an amplifier 2 to a suitable electric voltage, which is then converted by an analog-to-digital converter 3 into a digital data. A switch 4 is changed according to whether the driving mode is odd field mode or an even field mode. The digital data is once stored in a first memory (M1) 5 in the odd field mode or in a second memory (M2) 7 in the even field mode. Then, the digital data is fed to an adder 6 so as to add it to a sum of the previous data with respect to the same pixel, and the sum is stored in the first or second memory 5, 7. After n successive data are added, the sum is read from the first or second memory 5, 7 to be fed via a switch 8 to a digital-to-analog converter 9 which converts the sum into an analog signal at the standard read rate. The central processing unit 11 also controls the analog-to-digital conversion, the write and read of data of the memories 5, 7, the sum of data and the switches 4, 8 in correspondence with the driving of the charge-coupled device array 1.

In a charge-coupled device type solid state image sensing element, when the readout rate is increased up to several times the standard read rate, the capacitances of the photodetecting portion 101 and of the CCD portion 103 which govern the maximum charges $Q_{max}(PD)$ and $Q_{max}(CCD)$, respectively, do not lower so much. Especially, as the size of a pixel becomes smaller, the capacitance of the gate electrode becomes smaller, so that the above-mentioned high speed driving becomes more advantageous. Thus, when the read rate is increased n times the standard read rate, the density of signals per time is increased up to about n times at once. By using the memories 5, 7 and the adder 6, the signals are added n times with respect to the same pixels while the sums are read out from the memories 5, 7 at the standard read rate to reduce the density of signals per time to the usual one. The maximum charges to be dealt with in a pixel can be increased up to about n times.

Figure 4:
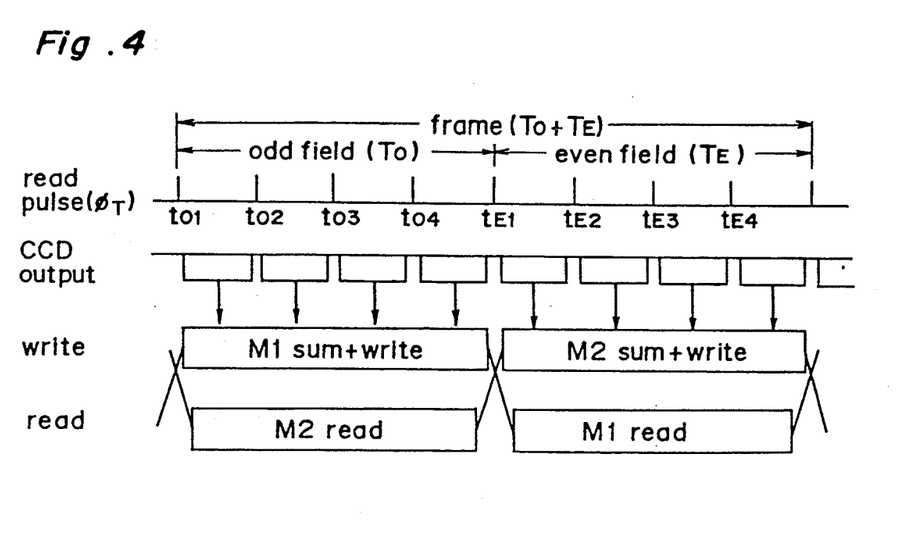
FIG. 4 is a timing chart of the solid state image sensing device when the read rate is enhanced.

FIG. 4 shows a timing chart of the solid state image sensing element mentioned above, when the quantity of light is high. A frame consists of an odd field and an even field, and the odd field begins at $t_O$ while the even field begins at $t_E$. The period of each field is chosen to be adapted, for example, with the standard read rate, namely 1/60 second at the NTSC standard. In the odd field, an image is sensed and the charge signals of the pixels of the charge-coupled device array 1 are transferred to the detecting part in four periods $T_{O1}$, $T_{O2}$, $T_{O3}$ and $T_{O4}$ each starting from $t_{O1}$, $t_{O2}$, $t_{O3}$ and $t_{O4}$ in a field. In each period $T_{On}$ ($n=1, 2, 3$ and $4$), the read pulse ($\phi_T$) is fed to the charge-coupled device array 1 so that signals S of two pixels of adjacent two arrays are summed to give $S_{l1}+S_{l2}$, $S_{l3}+S_4$, ..., and the signals are added by the adder 6 to be summed in the first memory 5. Then, the stored data are read out after a time $T_O/n$ passes, wherein $T_O$ designates the length of an odd field, and are added with signals to be read in the next period $T_{O,n+1}$ and the sums are stored again in the first memory 5. While the data are written in the first memory 5, the sums which have been stored in the second memory 7 are read at the standard read out rate.

Similarly, in an even field, an image is sensed and read in four periods $T_{E1}$, $T_{E2}$, $T_{E3}$ and $T_{E4}$ each starting from $t_{E1}$, $t_{E2}$, $t_{E3}$ and $t_{E4}$ in a field. In each period, $T_{En}$ ($n=1, 2, 3, 4$), the read pulse ($\phi_T$) is fed to the charge-coupled device array 1 so that signals S of two pixels of adjacent two arrays are summed to give $S_{l2}+S_{l3}$, $S_{l4}+S_{l5}$, ..., and the signals are added by the adder 6 to be stored in the second memory 7. Then, the stored data are read after a time $T_E/n$ passes and are added with signals to be read in the next period $T_{E,n+1}$ and the sums are stored again in the second memory 7. While the data are written in the second memory 7, the sums which have been stored in the first memory 5 are read at the standard read rate.

Figure 5:
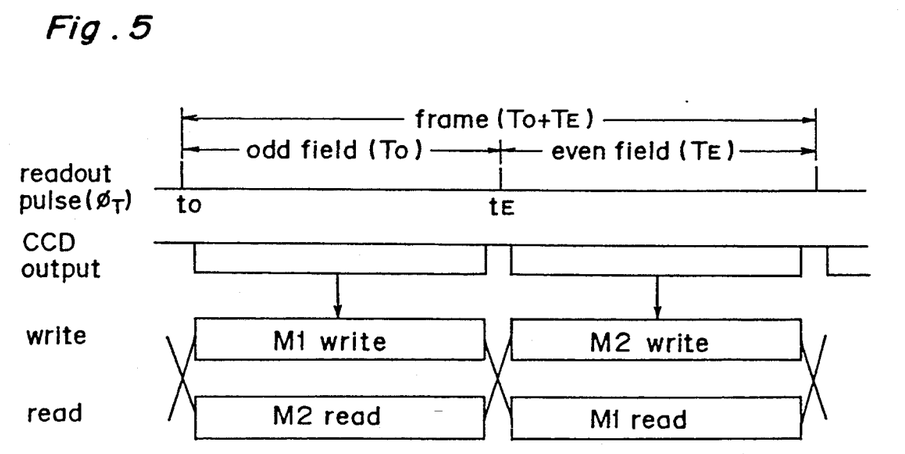
FIG. 5 is a timing chart when the read rate is the standard read rate.

When the quantity of light is low, it is better that n is one. FIG. 5 shows a timing chart when n=1. In this case, the read pulse ($\phi_T$) is fed once in an odd or even field as usual.

The memories 5 and 7 may be either analog or digital memories in principle.

Because the driving of the charge-coupled device is faster by n times when compared with the usual driving, it is necessary that the successive processing of the analog-to-digital transformation, the readout from the memory 5, 7, the sum and the storage in the memory should be performed fast. Then, it is effective that the successive processing is performed by M processing units arranged in parallel (for example M=n) in order to reduce the processing rate by a factor (1/M).

Figure 6:
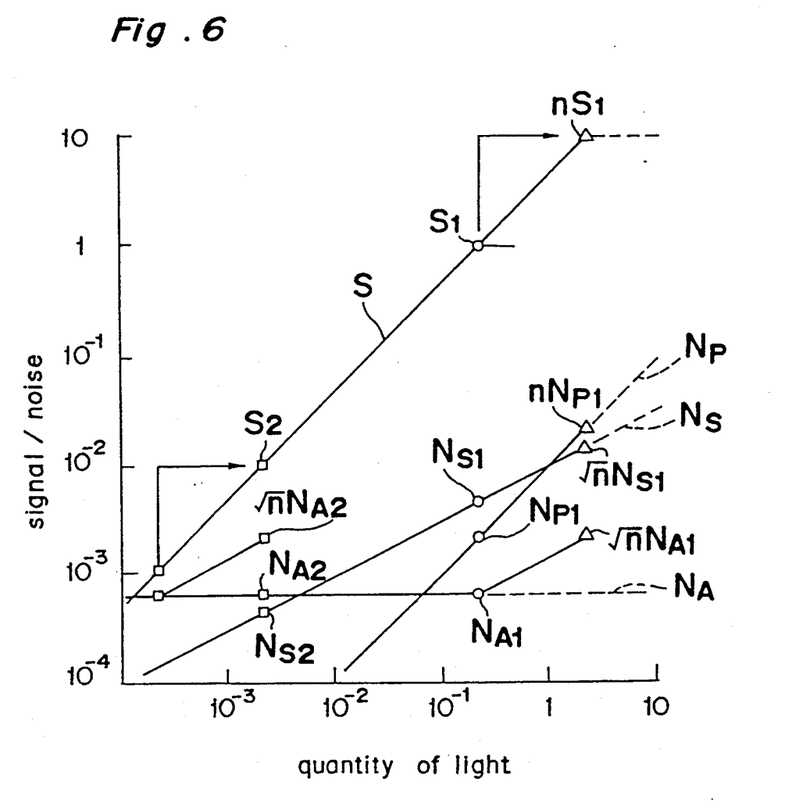
FIG. 6 is a graph of several quantities plotted against quantity of light.

FIG. 6 shows a graph of the level of signal/noise plotted against the quantity of light in a log scale. By using FIG. 6, the improvement of the performance of the solid state image sensing device is explained below. Noises in the output signal of the solid state image sensing device consists of sensitivity non-uniformity noises ($N_p$), photoelectric conversion noises ($N_s$) and output noises ($N_A$). The sensitivity non-uniformity noises come from the randomess of the sensitivity of the pixels. Because the sensitivity non-uniformity noises are proportional to the output signal, they become large at high quantities of light. The photoelectric conversion noises are shot noises which are generated at the photoelectric conversion in principle. Because they are proportional to the square root of the output signal, they become important at intermediate quantities of light. The output noises consist mainly of reset noises of the detecting part of the charge-coupled device array 1 and noises of the amplifier 2; because the output noises are constant and independent of the output signal, they become important at low quantities of light.

The maximum output signal to be dealt by the solid state image sensing device is designated as $S_1$ in FIG. 6, and the photoelectric conversion, sensitivity non-uniformity noises and output noises accompanying the output signal $S_1$ are designated as $N_{S1}$, $N_{P1}$ and $N_{A1}$, respectively. Then, the total noises amount to $\sqrt{(N_{S1})^2 + (N_{P1})^2 + (N_{A1})^2}$. In this invention, the image sensing is performed n times faster than the standard read rate. Then, the maximum output signal is expanded up to $n \ast S_1$. On the other hand, the photoelectric conversion noises increases up to $\sqrt{n} \ast N_{S1}$, the sensitivity non-uniformity noises up to $\sqrt{n} \ast n_{P1}$, and the output noises up to $\sqrt{N} \ast N_{A1}$. Then, the total noises amount to $$\sqrt{(\sqrt{n} \ast N_{S1})^2 + (n \ast N_{P1})^2 + (\sqrt{n} \ast N_{A1})^2}$$

which is less than $n\sqrt{(N_{S1})^2 + (N_{P1})^2 + (N_{A1})^2}$. Thus, the dynamic range is expanded.

On the other hand, when the quantity of light is low, it is preferable to drive the charge-coupled device array 1 at the standard read rate. When the Output signal is $S_2$, which is much lower than $S_1$, the total noises are $\sqrt{(N_{S2})^2 + (N_{A2})^2}$ where $N_{S2}$ and $N_{A2}$ are the photoelectric conversion noises and the output noises, respectively. The sensitivity non-uniformity noises can be neglected because the quantity of light is low. If the quantity of light is kept the same and the output read rate is increased n times, the output signal does not change and is the same as $S_2$ because the total integration period of the charge-coupled device array 1 does not change. That is, $S_2 = n \ast S_3$ where $S_3$ is the output signal of each integration period. On the other hand, the output noises increases due to the sum operations up to $\sqrt{n} \ast N_{A2}$. Thus, the total noises increases up to $\sqrt{(n \ast N_{A2})^2 + (N_{S2})^2}$. Therefore, when the quantity of light is low, the sum processing is not performed.

Figure 7:
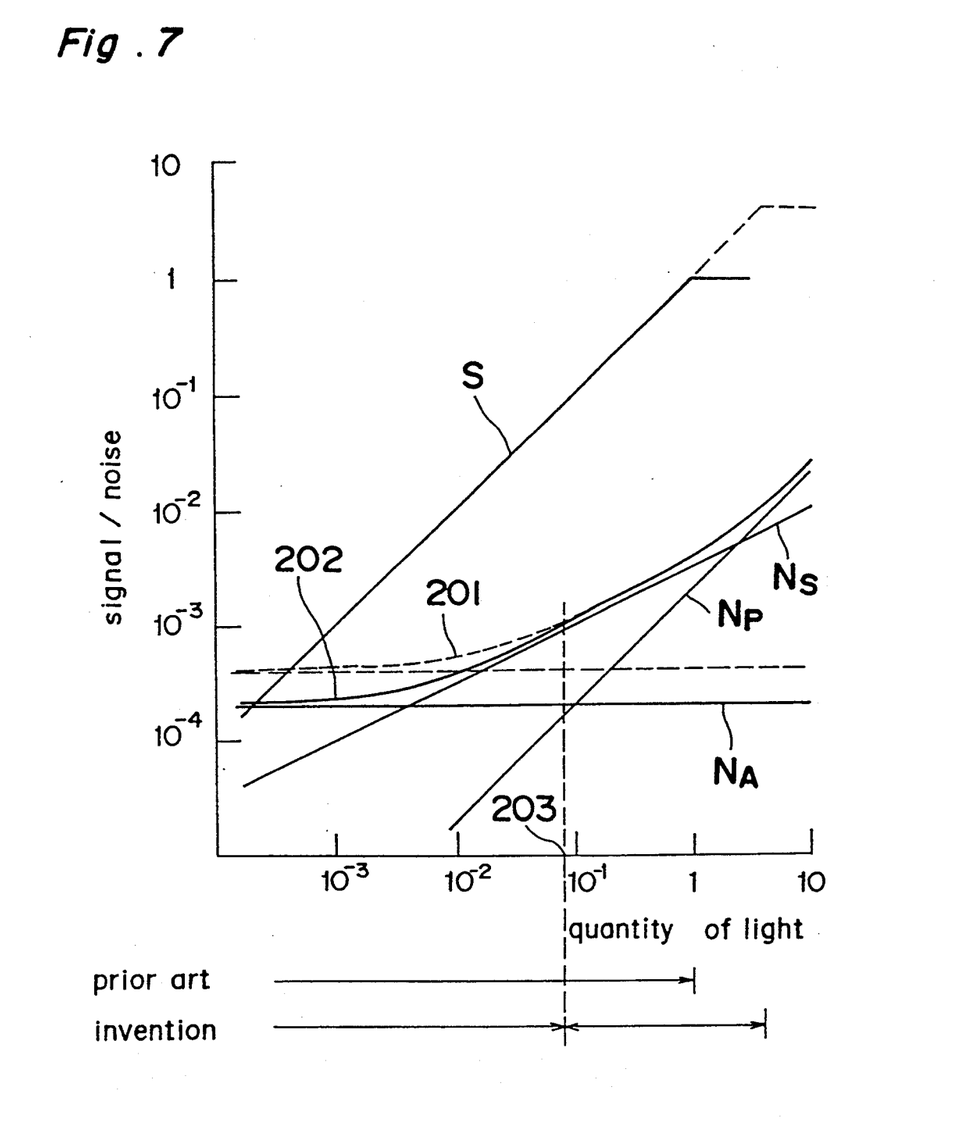
FIG. 7 is a graph of several quantities plotted against quantity of light.

As shown in FIG. 7, only noises of the output are different among various kinds of noises between the addition driving mode and the conventional driving mode. Then, the dependence of the total noises on the quantity of light is expressed as 201 and 202 in the addition driving mode and in the conventional mode, respectively. Therefore, the total noises in the addition driving mode becomes larger than those in the conventional mode if the amount of light exceeds a critical quantity of light 203. Thus, the addition driving mode is adopted above the critical quantity of light, otherwise the conventional mode is used. Though the value of the critical quantity of light depends on the ratios of various kinds of noises, it is generally of the order of a tenth the saturation quantity of light in the conventional mode.

Figure 8:
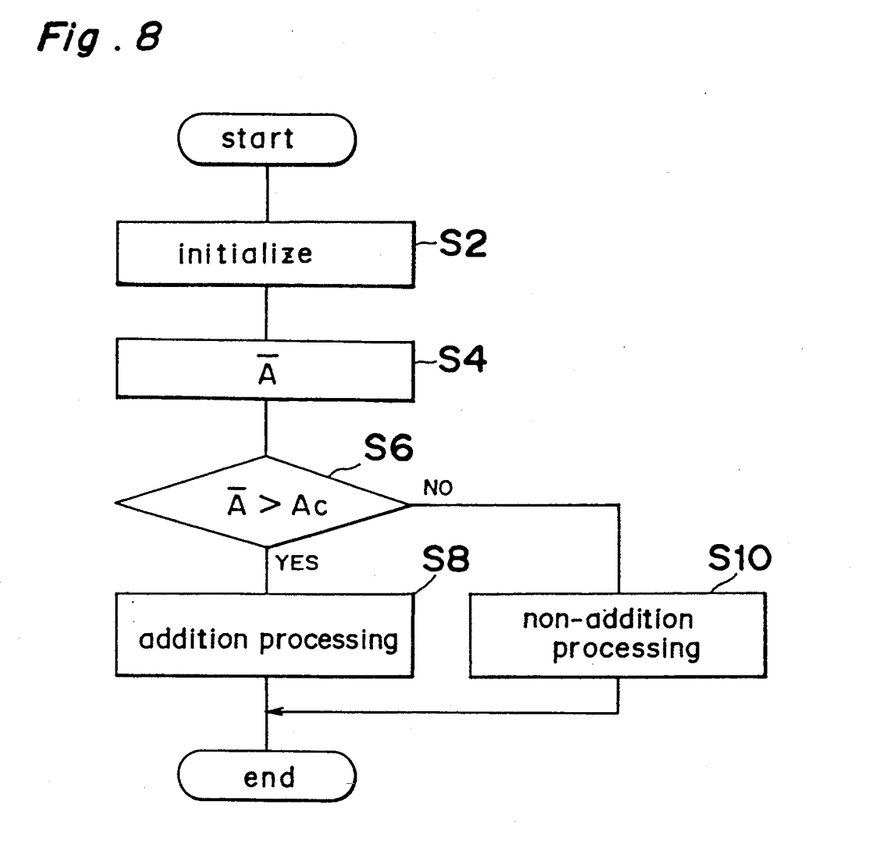
FIG. 8 is a flowchart of the processing of image data.

FIG. 8 shows a flow of mode change performed by CPU 11. First, the conventional (non-addition) processing mode is set as the initialization (step S2). Then, the output value A of the digital-to-analog converter 9 is averaged when the signals are read in the odd field of the n-th frame (step S4). Next, it is decided if the averaged value (A) is larger than the critical output $A_c$ (step S6). If the decision is decided to be YES, the addition processing is performed (step S8), otherwise the conventional (non-addition) processing is performed (step S10) when the data are written in the odd and even fields in the (n+1)-th frame.

As explained above, the dynamic range of the total image sensing device of two-dimensional array type can be expanded easily without changing the structure of the image sensing element itself. Especially, image sensing devices are now digital, so that an image sensing device according to the present invention can be used easily in a system.

The invention being thus described, it will be obvious that it may be varied in many ways. For example, the field storage mode is explained above. However, this invention can also be applied in a frame storage mode. Further, a frame transfer type device can also be used. Such variations are not to be regarded as a departure from the spirit and scope of the invention, and all such modifications as would be obvious to one skilled in the art are intended to be included within the scope of the following claims.

What is claimed is:

1. A solid state image sensing device comprising:
   (a) image sensing means for continuously sensing an optical image, said image sensing means including a two-dimensional array type charge-coupled device to produce image output signals with a predetermined image signal rate;
      rate increasing means for increasing the predetermined image signal rate of the output image signal by n times, wherein n is a positive integer greater than one;
   (b) adder means for adding the output image signals of said charge-coupled device, the output image signals of a same pixel or a same combination of pixels being added together n times, to generate respective pixel sum signals for each pixel or combination of pixels;

(c) two memory means for storing the output signals of said charge-coupled device and the respective pixel sum signals generated by said adder means, respectively; and (d) control means for supplying first clock signals of n times a predetermined read rate of said charge-coupled device to said image sensing means for image sensing, to one of said two memory means selected alternately in each frame of consecutive images, and to said adder means for adding and for supplying second clock signals of the predetermined read rate to the other of said two memory means for reading out the output image signals of said charge-coupled device at an output rate of 1/n times the increased image signal rate.

2. The solid state image sensing device according to claim 1, wherein the predetermined read rate is a standard read rate of said charge-coupled device.

3. The solid state image sensing device according to claim 1, wherein said control means supplies said second clock signals of the predetermined read rate to said image sensing means and said adder means when a quantity of light of the optical image does not exceed a predetermined value.

4. The solid state image sensing device according to claim 1, wherein the optical image is in an NTSC TV format.

5. A solid state image continuously sensing device comprising:

(a) image sensing means for sensing an optical image, said image sensing means including a two-dimensional array type charge-coupled device to produce output image signals with a predetermined image signal rate;

(b) adder means for adding the output signals of said charge-coupled device, the output signals of a same pixel or a same combination of pixels being added together n times, wherein n is a positive integer larger than one, to generate respective pixel sum signals for each pixel or combination of pixels;

(c) first memory means for storing the output signals of said change-coupled device during a first period;

(d) second memory means for storing the respective pixel sum signals generated by said adder means during a second period, whereby one of said first and second memory means is written into while the other is read; and (e) control means for controlling said first and second memory means to be read and written into alternately, for supplying first clock signals of n times a predetermined read rate of said charge-coupled device to said image sensing means for image sensing, to said second memory means, and to said adder means for adding and for supplying second clock signals of the predetermined read rate to said first memory means for reading out the output signals of said change-coupled device.

6. The solid state image sensing device according to claim 5, wherein the predetermined read rate is a standard read rate of said charge-coupled device.

7. The solid state image sensing device according to claim 5, wherein said control means supplies said second clock signals of the predetermined read rate to said image sensing means and said adder means when a quantity of light of the optical image does not exceed a predetermined value.

8. The solid state image sensing device according to claim 5, wherein the optical image is in an NTSC TV format.

9. An image sensing apparatus for generating image data comprising:

image sensing means for continuously sensing an optical image, said image sensing means comprising a plurality of pixels disposed in an array;

memory means, including first and second storage means coupled to said image sensing means, for storing pixel signals generated by said plurality of pixels;

control means for generating a first clock signal which corresponds to a predetermined standard read rate of said image sensing means and a second clock signal which is n times the predetermined standard read rate of said image sensing means, wherein n is an integer greater than 1; and adder means, coupled to said memory means, for adding together pixel signals from a same pixel or a same combination of pixels n times during a field period, in accordance with said second clock signal, to generate respective pixel sum signals for each pixel or combination of pixels, the respective pixel sum signals thereafter being stored in said memory means, said control means controlling the image sensing apparatus to write the pixel signals of said plurality of pixels into said memory means once during a field period and to subsequently read out the stored pixel signals as the image data in synchronism with said first clock signal when a quality of light of the optical image does not exceed a predetermined value, and write the pixel signals of said plurality of pixels into said memory means n times during a field period in synchronism with said second clock signal and to subsequently read out the stored respective pixel sum signals as the image data, when the quantity of light from the optical image exceeds the predetermined value, said control means controlling the image sensing apparatus to store the pixel signals of said plurality of pixels of odd fields in said first storage means and the pixel signals of said plurality of pixels of even fields in said second storage means.

10. The image sensing apparatus of claim 7, said control means further controlling the image sensing apparatus to store the respective pixel sum signals of odd fields in said first storage means and the respective pixel sum signals of even fields in said second storage means.

11. The image sensing apparatus of claim 10, said control means further controlling the image sensing apparatus to write the pixel signals into one of said first and second storage means and to simultaneously read the image data of a previous field period from the other of said first and second storage means.

12. The solid state image sensing apparatus of claim 9, wherein said image sensing means comprises a two-dimensional array type charge-coupled means.

13. The solid state image sensing apparatus of claim 9, wherein n=4.

14. The image sensing apparatus of claim 9, wherein the optical image is in an NTSC TV format.

15. A method of generating image data comprising the steps of:

generating pixel signals by continuously sensing an optical image with image sensing means which comprises a plurality of pixels disposed in an array;

generating in control means a first clock signal which corresponds to a predetermined standard read rate of the image sensing means and a second clock signal which is n times the predetermined standard read rate of the image sensing means, wherein n is an integer greater than 1; and generating the image data in accordance with the plurality of pixel signals, under direction of the control means, said step of generating image data comprising writing the pixel signals for the plurality of pixels into memory means once during a field period in synchronism with the first clock signal and then subsequently reading the stored pixel signals out of the memory means as the image data in synchronism with the first clock signal, when a quantity of light of the optical image does not exceed a predetermined value, and writing the pixel signals of the plurality of pixels into the memory means n times during a field period in synchronism with the second clock signal, adding together in adder means stored pixel signals from a same pixel or a same combination of pixels n times during a field period to generate respective pixel sum signals for each pixel or combination of pixels, storing the respective pixel sum signals in the memory means, and then subsequently reading out the stored respective pixel sum signals out of the memory means in synchronism with the first clock signal, when a quantity of light of the optical image exceeds the predetermined value, said steps of writing the pixel signals of the plurality of pixels into the memory means comprises writing the pixel signals of odd fields in first storage means of the memory means and the pixel signals of even fields in second storage means of the memory means.

16. The method of generating image data of claim 13, wherein said step of storing the respective pixel sum signals in the memory means comprises storing the respective pixel sum signals of odd fields in the first storage means and the respective pixel sum signals of even fields in the second storage means.

17. The method of generating image data of claim 16, wherein the pixel signals are written into one of the first and second storage means while the image data of a previous field period is simultaneously read from the other of the first and second storage means.

18. The method of generating image data of claim 15, wherein pixel signals are generated by a two-dimensional array type charge-coupled means.

19. The method of generating image data of claim 15, wherein n=4.

20. The method of claim 15, wherein the optical image is in an NTSC TV format.

21. A solid state image sensing device comprising:

(a) image sensing means for continuously sensing an optical image, said image sensing means including a two-dimensional array type charge-coupled device to produce image output signals with a variable read rate wherein the image output signals of a particular pixel or a particular combination of pixels are added together to generate pixel sum signals for each particular pixel or each particular combination of pixels;

(b) two memory means for storing image signals received from said charge-coupled device in an odd field and in an even field, in consecutive images, respectively; and (c) control means for supplying first clock signals to said image sensing means for image sensing, to one of said two memory means alternately selected for writing, depending on whether a field to be processed is an even field or an odd field and to adder means for adding and for supplying second clock signals to the other of said two memory means for reading, the first clock signals having a rate of n times a predetermined read rate of said charge-coupled device, wherein n is a positive integer greater than one, the second clock signals having a rate equal to the predetermined read rate;

said adder means for adding the output image signals of said charge-coupled device to signals stored in said one of two memory means alternately selected to write results of the adding to said one of said two memory means, whereby said adder means carries out the addition n times in each field.

22. The solid state image sensing device according to claim 21, wherein said predetermined read rate of said charge-coupled device is an NTSC standard.

23. The solid state image sensing device according to claim 21, wherein said control means supplies said second clock signals of the predetermined read rate to said image sensing means and said adder means when a quantity of light of the optical image does not exceed a predetermined value.

24. A solid state image sensing device having an addition mode and non-addition mode, said solid state image sensing device comprising:

image sensing means for continuously sensing an optical image, said image sensing means including a two-dimensional array type charge-coupled device for producing image output signals with a variable read rate, wherein the output image signals of a particular pixel or a particular combination of pixels are added together to generate pixel sum signals for each particular pixel or particular combination of pixels;

two memory means for storing image signals received from said charge-coupled device in an odd field and in an even field in consecutive images, respectively;

decision means for deciding if a mode of the image sensing device is the addition mode or the non-addition mode;

adder means for adding the output image signals of said charge-coupled device to signals stored in said one of said two memory means alternately selected and for writing the sum to said one of said two memory means, whereby said adder means carries out the addition n times in each field in the addition mode;

control means for supplying first clock signals to said image sensing means for image sensing, to one of said two memory means alternately selected for writing depending on whether a field to be processed is an odd field or an even field and to said adder means for adding, for supplying second clock signals to the other of said two memory means for reading when said decision means decides that the mode is the addition mode, the second clock signals having a rate of a predetermined read rate of said charge-coupled device, the first clock signals having a rate of n times the predetermined read rated, wherein n is a positive integer larger than one, and for supplying the second clock signals to said image sensing means for sensing and to said two memory means for writing and for reading when said decision means decides that the mode is the non-addition mode.

25. The solid state image sensing device according to claim 24, wherein said decision means decides that the mode is the non-addition mode if a total signal-to-noise ratio in an added quantity of light in the addition mode is larger than a total signal-to-noise ratio in the non-addition mode.

26. The solid state image sensing device according to claim 24, wherein the predetermined read rate of said charge-coupled device is an NTSC standard.

* * * * *